(12) United States Patent  
Goodson et al.

(10) Patent No.: US 9,490,934 B2  
(45) Date of Patent: Nov. 8, 2016

(54) MANAGING CROSSTALK IN DSL SYSTEM

(71) Applicant: Adtran Inc., Huntsville, AL (US)

(72) Inventors: Richard Lee Goodson, Huntsville, AL (US); Kenneth David Ho, Clearwater, FL (US)

(73) Assignee: Adtran, Inc., Huntsville, AL (US)

( * ) Notice: Subject to any disclaimer, the term of this patent is extended or adjusted under 35 U.S.C. 154(b) by 93 days.

(21) Appl. No.: 14/502,573

(22) Filed: Sep. 30, 2014

(65) Prior Publication Data

US 2015/0381309 A1  Dec. 31, 2015

Related U.S. Application Data

(60) Provisional application No. 62/017,928, filed on Jun. 27, 2014.

(51) Int. Cl.
| | |
|---|---|
| *H04L 1/00* | (2006.01) |
| *H04M 7/00* | (2006.01) |
| *H04B 3/02* | (2006.01) |
| *H04M 11/06* | (2006.01) |

(52) U.S. Cl.
CPC .............. *H04L 1/0002* (2013.01); *H04B 3/02* (2013.01); *H04M 7/0093* (2013.01); *H04M 11/06* (2013.01); *H04M 11/062* (2013.01)

(58) Field of Classification Search
CPC ........................ H01L 1/0002; H04M 7/0093
USPC ........................................................ 370/252
See application file for complete search history.

(56) References Cited

FOREIGN PATENT DOCUMENTS

| EP | 0720405 A2 * | 7/1996 | .......... H04B 7/2656 |
|---|---|---|---|
| WO | 2014/057137 | 4/2014 | |
| WO | 2014/064699 | 5/2014 | |

OTHER PUBLICATIONS

International Search Report and Written Opinion of the International Searching Authority issued in International Application No. PCT/US2015/037683 on Aug. 31, 2015; 10 pages.

* cited by examiner

*Primary Examiner* — Ronald B Abelson  
(74) *Attorney, Agent, or Firm* — Fish & Richardson P.C.

(57) ABSTRACT

Methods, systems, and apparatus for crosstalk avoidance in a telecommunications network are disclosed. In one aspect a method includes determining, by a network element and for each vectoring group from multiple vectoring groups, a transmission load of the vectoring group based on transmission loads of links within the vectoring group; identifying, by the network element, a resource allocation interval (RAI) that is shared by the multiple vectoring groups; determining, based on the transmission load of each vectoring group and by the network element, a first portion of the RAI that will be a normal operation interval (NOI) and a second portion of the RAI that will be a discontinuous operation interval (DOI); transmitting, by the network element, data over all of the multiple vectoring groups during at least a portion of the NOI; and transmitting, by the network element, data over fewer than all of the vectoring groups during the entire DOI.

21 Claims, 8 Drawing Sheets

MANAGING CROSSTALK IN DSL SYSTEM

BACKGROUND

This specification relates to communications in a telecommunications environment.

Crosstalk can interfere with communications in a digital subscriber line (DSL) system. Crosstalk refers to the electromagnetic coupling between neighboring twisted pairs. Vectoring (also referred to as vectoring techniques or vectored transmission) is a technology for canceling crosstalk in DSL systems. In order for vectoring to be effective, all crosstalkers generally need to be included in a "vectoring group" (also known as vector group) so that the crosstalk between twisted pairs within a vectoring group (also referred to as "intra-group crosstalk) can be cancelled. However, the twisted pair conductors outside of a particular vectoring group (e.g., belonging to other vectoring groups) can introduce crosstalk between vectoring groups. In some instances, the crosstalk between vectoring groups can be referred to as inter-group crosstalk. The existence of inter-group crosstalk can still degrade performances of a vectored system.

SUMMARY

In general, one innovative aspect of the subject matter described in this specification can be embodied in methods that include determining, by a network element and for each vectoring group from multiple vectoring groups, a transmission load of the vectoring group based on transmission loads of links within the vectoring group; identifying, by the network element, a resource allocation interval (RAI) that is shared by the multiple vectoring groups; determining, based on the transmission load of each vectoring group and by the network element, a first portion of the RAI that will be a normal operation interval (NOI) and a second portion of the RAI that will be a discontinuous operation interval (DOI); transmitting, by the network element, data over all of the multiple vectoring groups during at least a portion of the NOI; and transmitting, by the network element, data over fewer than all of the vectoring groups during the entire DOI.

Another innovative aspect of the subject matter described in this specification can be embodied in a device that includes a memory storing instructions executable by one or more data processing devices; and one or more data processing devices that interact with the memory and execute instructions that cause the device to be configured to: determine, for each vectoring group from multiple vectoring groups, a transmission load of the vectoring group based on transmission loads of links within the vectoring group; identify a resource allocation interval (RAI) that is shared by the multiple vectoring groups; determine, based on the transmission load of each vectoring group, a first portion of the RAI that will be a normal operation interval (NOI) and a second portion of the RAI that will be a discontinuous operation interval (DOI); transmit data over all of the multiple vectoring groups during at least a portion of the NOI; and transmit data over fewer than all of the vectoring groups during the entire DOI.

Another innovative aspect of the subject matter described in this specification can be embodied in a system that includes multiple network elements; and at least one of the multiple the network element including one or more data processing devices configured to: determine, for each vectoring group from multiple vectoring groups, a transmission load of the vectoring group based on transmission loads of links within the vectoring group; identify a resource allocation interval (RAI) that is shared by the multiple vectoring groups; determine, based on the transmission load of each vectoring group, a first portion of the RAI that will be a normal operation interval (NOI) and a second portion of the RAI that will be a discontinuous operation interval (DOI); transmit data over all of the multiple vectoring groups during at least a portion of the NOI; and transmit data over fewer than all of the vectoring groups during the entire DOI.

These and other embodiments can each optionally include one or more of the following features. Determining a first portion of the RAI that will be a NOI and a second portion of the RAI that will be a DOI can include determining a start time of the NOI and a start time of the DOI. Determining a first portion of the RAI that will be a NOI and a second portion of the RAI that will be a DOI can include determining a first number of symbols to be allocated to the NOI and a second number of symbols to be allocated to the DOI. Determining, for each vectoring group from multiple vectoring groups, a transmission load of the vectoring group can include determining a total number of symbols required to transmit all transmission loads of the multiple vectoring groups given that a particular number of symbols is allocated to the NOI. Determining a first portion of the RAI that will be a NOI and a second portion of the RAI that will be a DOI can include determining a first number of symbols to be allocated to the NOI and a second number of symbols to be allocated to the DOI such that the total number of symbols required to transmit all transmission loads of the multiple vectoring groups is a minimum. Determining, for each vectoring group from multiple vectoring groups, a transmission load of the vectoring group can include, for a link within the vectoring group: determining a first data rate of the link during an NOI; determining a second data rate of the link during a DOI; determining a number of symbols required to transmit a transmission load of the link based on the first data rate and second data rate, given that a particular number of symbols is allocated to the NOI; and determining a number of symbols required to transmit the transmission load of the vectoring group based on the number of symbols required to transmit the transmission load of the link, given that a particular number of symbols is allocated to the NOI. In some instances, different transmission intervals can be allocated to the multiple vectoring groups within the DOI.

Particular embodiments of the subject matter described in this specification can be implemented so as to realize one or more of the following advantages. The example techniques can allow vectoring to be used even when the number of twisted pair conductors is larger than the maximum vectoring group size. The example techniques can provide good system performance (e.g., low residual crosstalk level and high signal quality) within a vectoring group, allow high peak rates when only one vectoring group is transmitting, and enable a single link/vectoring group to make use of all available transmission time, for example, when other links/vectoring groups within the same wire binder do not have data to send at a particular time. In some implementations, the example techniques can allocate resources (e.g., bandwidth, transmission time, etc.) based on the transmission load to be sent by each of the various vectoring groups, for example, according to one or more fairness criteria. In some implementations, the example techniques can optimize or otherwise improve on overall throughput of the communications system, and can minimize or otherwise reduce resources consumption. The example techniques may require less power compared to continuous vectoring operations. The features described in this document may improve communications technologies, and in a particular example, transmission speed and reliability in DSL systems relative to systems that do not incorporate the features of this document. The features described in this document may improve crosstalk cancellation technologies that are used in various communications systems by using a combination of crosstalk avoidance and crosstalk cancellation techniques to increase achievable data rates.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
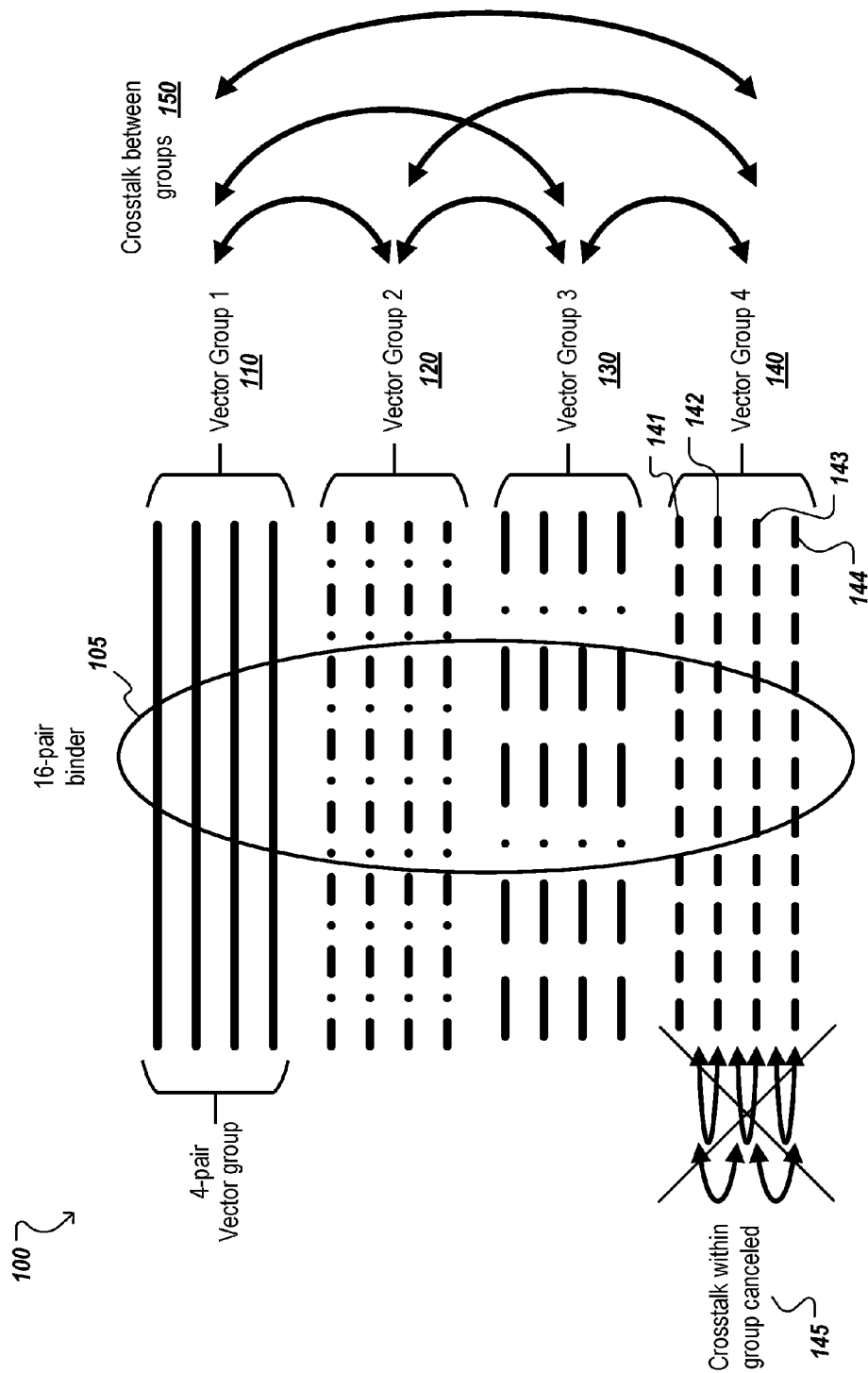
FIG. 1 is a block diagram showing example effects of crosstalk when multiple vectoring groups are used for transmission in a telecommunications network.

This document describes example techniques for managing crosstalk in a digital subscriber line (DSL) system (e.g., a system that implements DSL technologies). The example techniques allow multiple vectoring groups to coexist in a single wire binder even when the number of twisted pair conductors (can also referred to as "lines" or "links") contributing crosstalk into the system exceeds the maximum vectoring group size.

In some instances, a wire binder can include one or more twisted pair conductors over which two or more network elements can communicate in a telecommunications system. For instance, a wire binder can include multiple twisted pair conductors that are grouped into one or more vectoring groups to cancel intra-group crosstalk within the respective vectoring groups. In some implementations, the maximum number of twisted pair conductors that can be included in a particular vectoring group for purposes of crosstalk cancellation may be limited. For example, VDSL2 vectoring techniques can generally cancel crosstalk across hundreds of (e.g., 200) twisted pair conductors, while G.fast vectoring techniques may be limited to cancelling crosstalk across a much smaller number of (e.g., four to sixteen) twisted pair conductors. As such, there may be more than one vectoring group in a wire binder. The twisted pair conductors outside of a particular vectoring group (e.g., belonging to other vectoring groups) can introduce inter-group crosstalk between vectoring groups that can impair the system performance.

In some aspects, to reduce or eliminate the effects of inter-group crosstalk that arises between twisted pair conductors outside a vectoring group, the example techniques include crosstalk avoidance schemes to restrict simultaneous transmissions by two or more vectoring groups. For example, by enforcing a rule that no two vectoring groups can transmit simultaneously during a specified period, the performance of the vectoring group that is transmitting will not be degraded by crosstalk from transmissions on other vectoring groups (crosstalk avoidance). As such, the noise level can be managed, and signal quality (e.g., signal to noise ratio) and other system performance parameters can be improved.

In some aspects, the example crosstalk avoidance techniques allow resources (e.g., time, frequency, space, etc.) to be distributed among some or all vectoring groups. Allocation of the resources can be performed, for example, according to a fairness criterion. As an example, transmission loads (e.g., in terms of time, bits, bytes, symbols, etc.) can be allocated to all vectoring groups that have data to transmit according to a max-min-fair criterion. For instance, a shared time duration can be distributed (e.g., evenly) among all vectoring groups that have data to transmit. Any time not used by a group (e.g., because of a relatively small data load to be transmitted on that group) can be distributed (e.g., evenly or according to data load to be transmitted) among the remaining groups. In some instances, this example technique is referred to as max-min fair crosstalk avoidance. In some implementations, transmit time, not bits, can be used as the basis for fairness so that low-rate links do not "hog" resources.

In some aspects (e.g., from the throughput perspective), it may be beneficial to allow multiple different vectoring groups to transmit simultaneously even though crosstalk among the different vectoring groups will reduce the amount of data that can be transmitted by each of the individual vectoring groups. For instance, a sum of the data rates of the multiple vectoring groups transmitting simultaneously may be higher than the data rate provided by a single vectoring group using crosstalk avoidance techniques, despite the individual data rate provided by each vectoring group potentially being lowered due to the inter-group crosstalk between the vectoring groups.

Example crosstalk management techniques can incorporate the two transmission modes (e.g., transmitting over only a single vectoring group at one time and transmitting over all vectoring groups simultaneously) and allow the multiple vectoring groups to transition between the two different transmission modes. Example techniques are disclosed in this document for determining when to use simultaneous transmission and when to limit transmission to only one vectoring group at a time, for example, such that the overall throughput of the multiple vectoring groups can be increased or maximized.

The example techniques described herein can be implemented as, or in, methods, computer program products, apparatus, devices, etc., for example, to manage crosstalk introduced by multiple twisted pair conductors included in a wire binder, thereby improving communications performances (e.g., quality of service (QoS)) over a telecommunications network (e.g., by cancelling crosstalk among links within a vectoring group using vectoring techniques and/or reducing or eliminating crosstalk between vectoring groups using crosstalk avoidance techniques). The example techniques can improve or optimize the system throughput and/or reduce or minimize resources consumption.

The example techniques can be implemented in a centralized (e.g., processed in a centralized location like a controller card) or a distributed (e.g., distributed among the line cards) manner.

The example techniques can be applied to standard "G.fast" discontinuous operation and can interwork with the G.fast dynamic resource allocation (DRA) to generate a max-min-fair treatment of the offered load from each vectoring group. The example techniques can be applied to frequency division vectoring (FDV) systems (described below) in which VDSL2 and G.fast channels are bonded together to each subscriber. The example techniques can be applied to additional or different systems.

Throughout this document the terms downlink, downstream (DS) and downstream communications are used to refer to communications transmitted toward the end user or subscriber, while the terms uplink, upstream (US) and upstream communications are used to refer to communications transmitted toward the service provider (e.g., a telecommunications service provider's central office).

Figure 2:
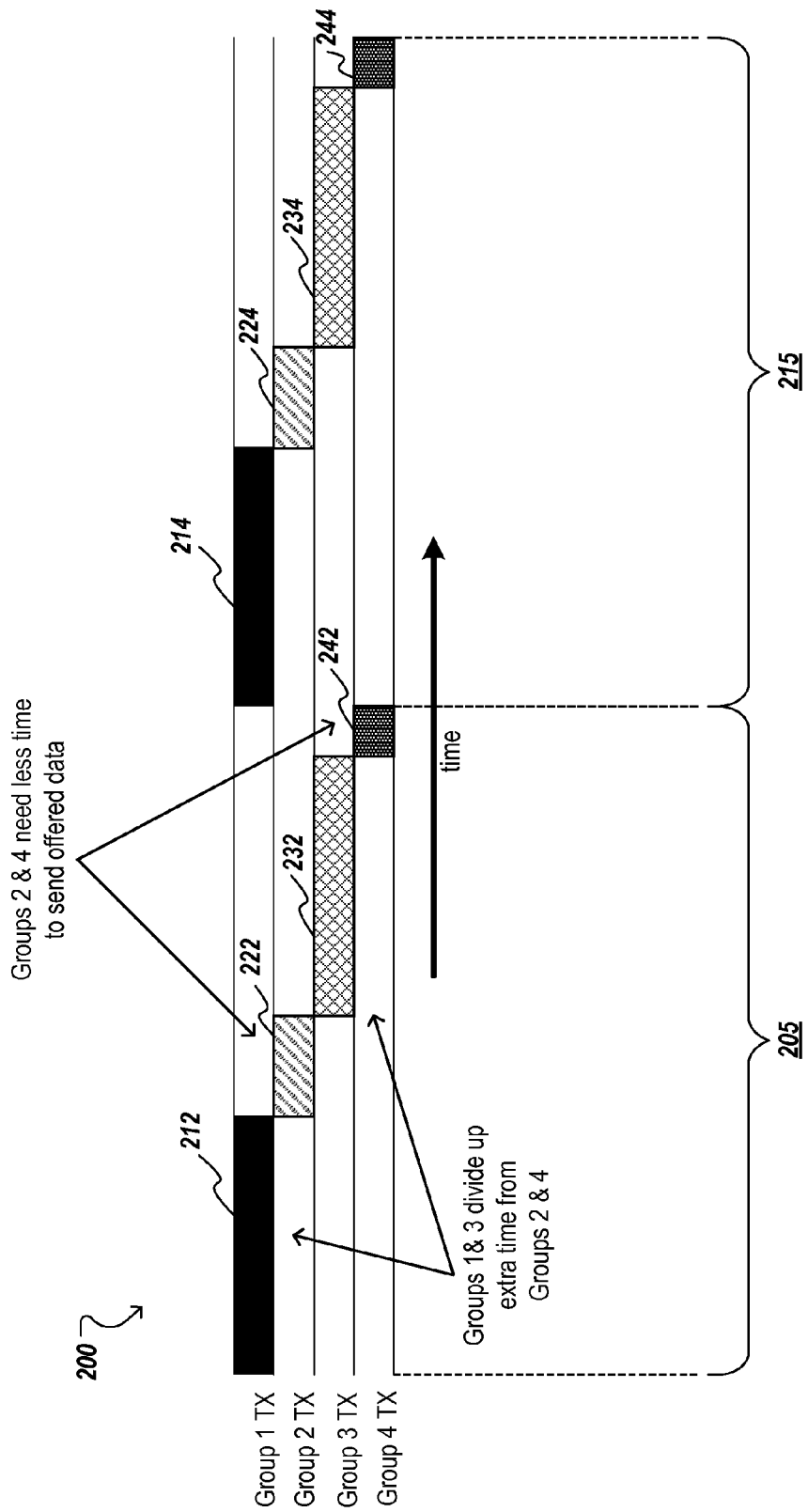
FIG. 2 is a block diagram showing an example crosstalk avoidance scheme.
Figure 3:
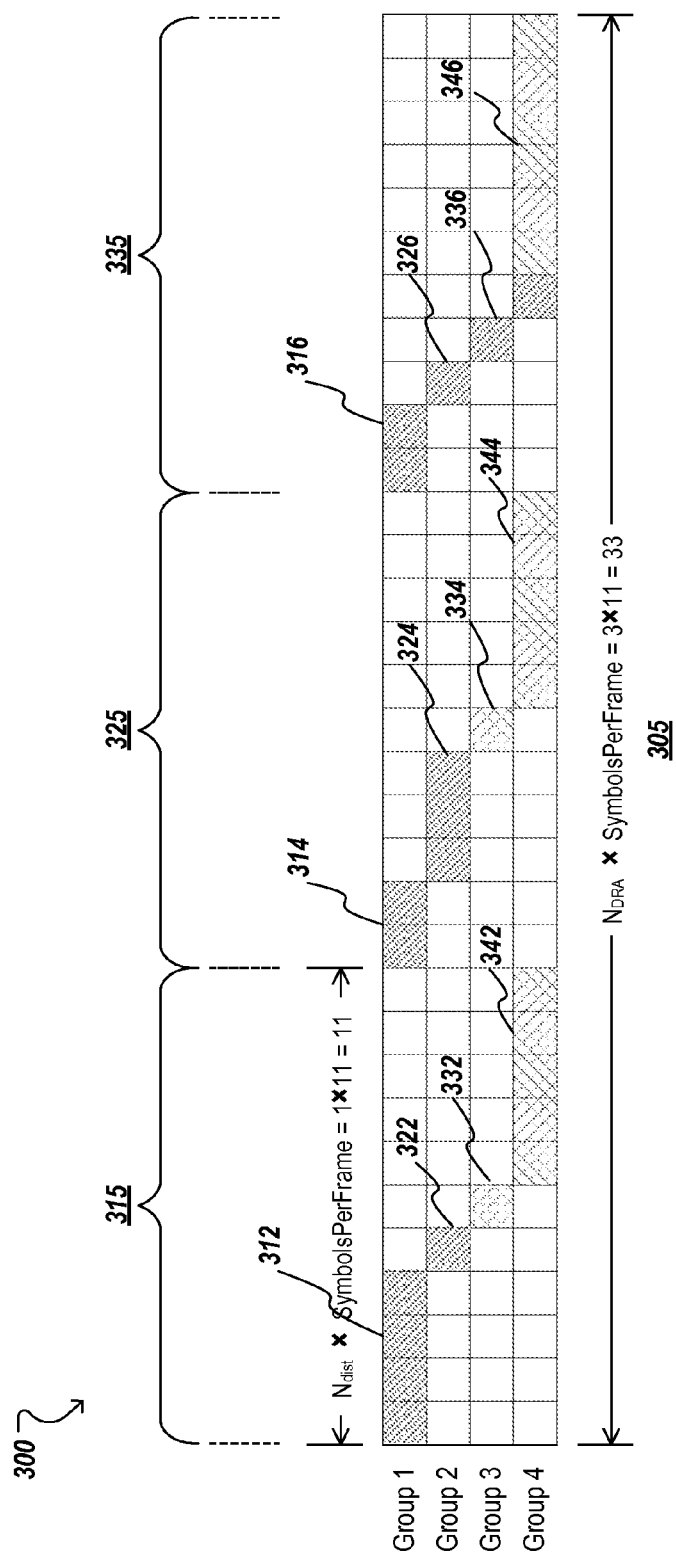
FIGS. 3 and 4 are block diagrams showing example crosstalk avoidance schemes in distributed modes.
Figure 4:
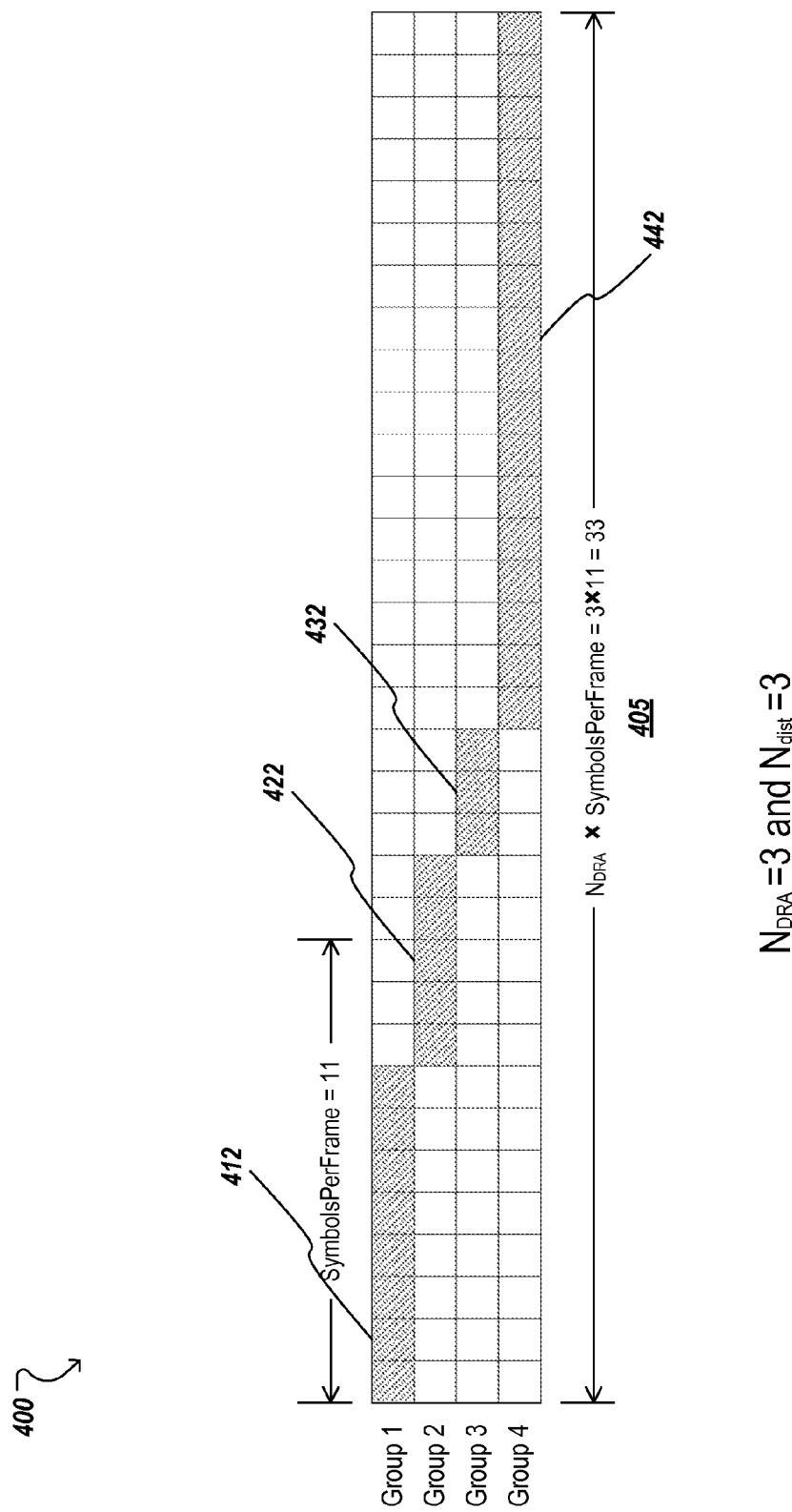
Figure 5:
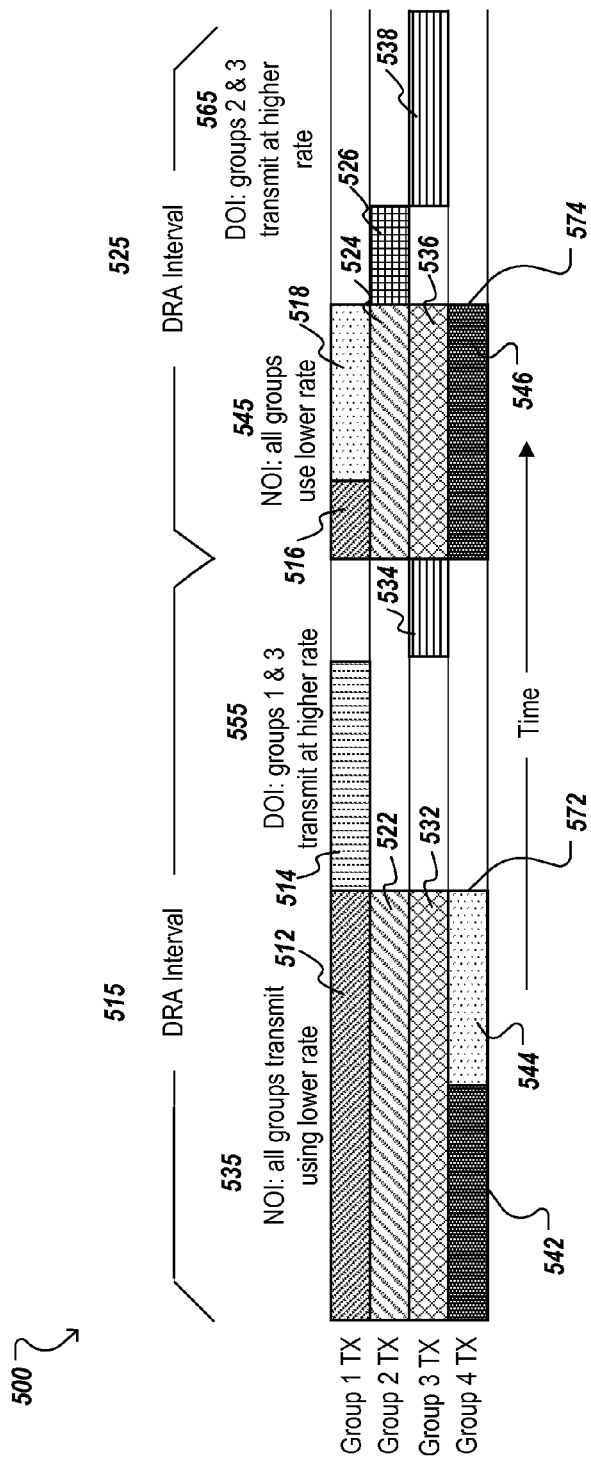
FIG. 5 is a block diagram showing another example crosstalk avoidance scheme.
Figure 6:
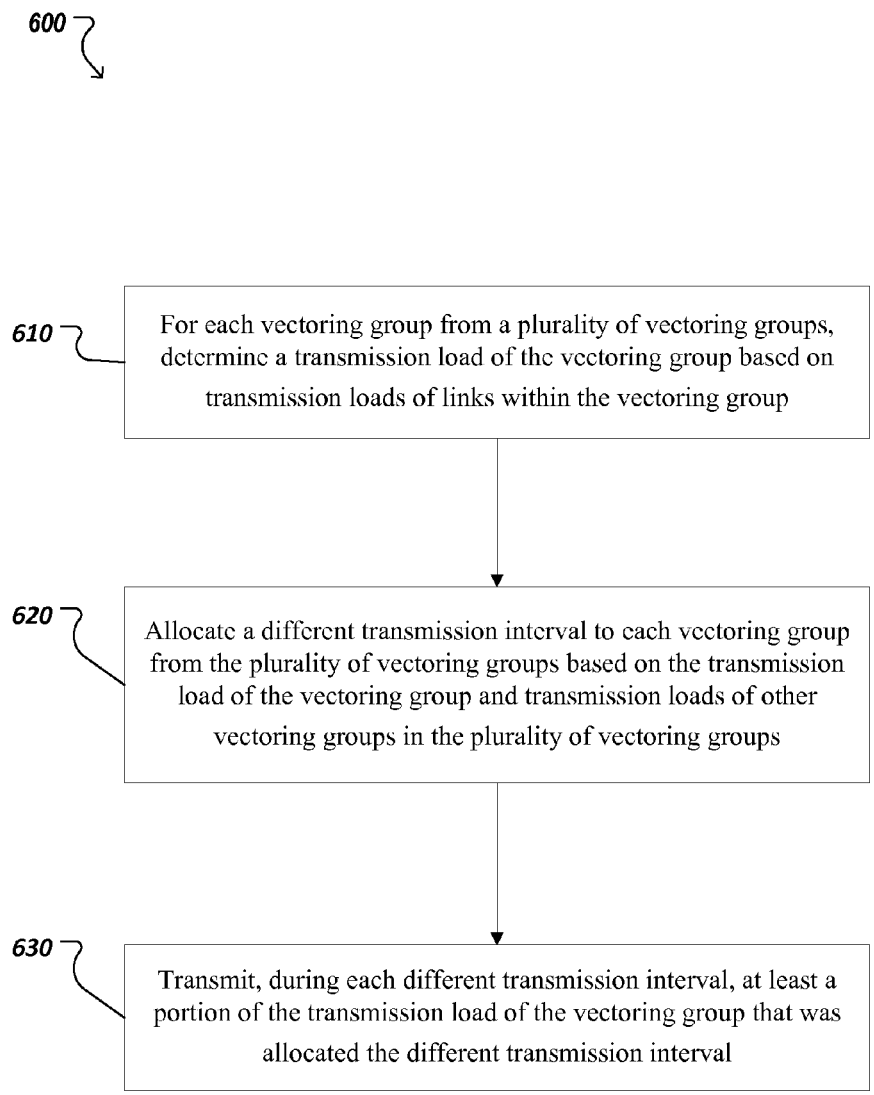
FIG. 6 is a flow chart of an example process for avoiding crosstalk among multiple vectoring groups.
Figure 7:
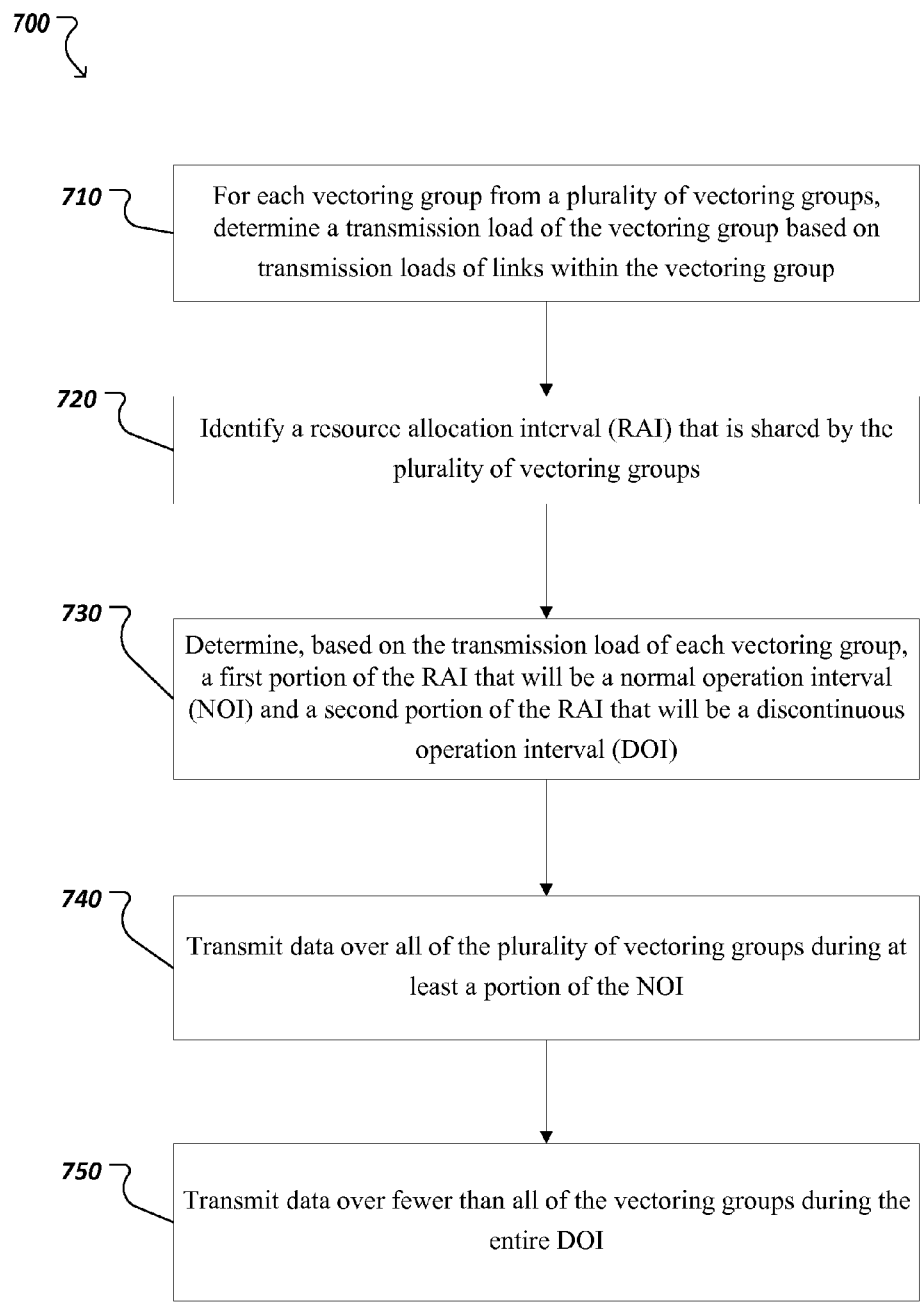
FIG. 7 is a flow chart of an example process for managing crosstalk among multiple vectoring groups.

The description referencing FIG. 1 shows example crosstalk effects when multiple vectoring groups are include in a wire binder for data transmissions. While FIGS. 2-4 show specific examples of the crosstalk avoidance schemes and FIG. 5 shows a specific example of a crosstalk management scheme, FIGS. 6 and 7 provide details regarding example methods for avoiding and managing crosstalk when multiple vectoring groups are used for data transmission in a telecommunication system. The discussion referencing FIG. 8 describes an example telecommunications environment to which the example crosstalk management techniques can be applied.

FIG. 1 is a block diagram 100 showing example intra-group crosstalk within a vectoring group and inter-group crosstalk between vectoring groups when vectoring techniques are used in a communication environment. The communication environment may be the example environment 100 in FIG. 1 or another environment. The vectoring techniques can include, for example, VDSL2 vectoring techniques, G.fast vectoring techniques, or other vectoring techniques.

In this example, the diagram 100 includes a wire binder 105 that includes wire pairs assigned to multiple vectoring groups. As illustrated, the wire binder 105 includes four vectoring groups 110, 120, 130, and 140. Each vectoring group includes four twisted pair conductors (also referred to as links). As such, the wire binder 105 is a 16-pair binder. In some implementations, the wire binder 105 can include a different number of vectoring groups, and each vectoring group can include a different number of links.

Within each vectoring group (e.g., the vectoring group 4), the crosstalk 145 between the links 141, 142, 143, and 144 within the vectoring group 4 can be cancelled, for example, by joint signal processing of all signals transmitted over the links 141, 142, 143, and 144. For instance, vectoring control apparatus of a network element can process signals transmitted over the links 141, 141, 143, and 144 and thus cancel the intra-group crosstalk 145 within the vectoring group 4.

Among the multiple different vectoring groups 110, 120, 130, and 140, however, the inter-group crosstalk 150 between these vectoring groups will not be cancelled. The inter-group crosstalk 150 between the vectoring groups 110, 120, 130, and 140 can reduce the signal to noise ratio, limit data rates, and degrade the performance of the system.

In some instances, it is desirable to support transmission of data within binder groups that contain more wire pairs than can be vectored within a single vectoring group, for example, to provide data rates higher than can be provided using vectoring alone while achieving satisfactory system performance (e.g., signal quality and/or bit error rates).

For instance, when there are multiple vectoring groups in a wire binder, resources (e.g., transmission time or slots) of a particular transmission interval can be distributed among all groups with data to send. In some instances, the total transmission time shared by multiple vectoring groups during a particular interval can be referred to as a DRA (dynamic resource allocation) interval. For example, in a G.fast system, a DRA interval can be defined as $N_{DRA}$ time division multiplex (TDD) frames. $N_{DRA}$ may be as small as one TDD frame. In some implementations, a TDD frame can include a number of symbols (e.g., discrete multitone (DMT) symbols).

Given a DRA interval shared by multiple different vectoring groups within a wire binder, in some instances, a rule can be enforced that no two vectoring groups can transmit simultaneously during some or all symbols of a frame to avoid crosstalk between transmissions on the different vectoring groups. This scheme can be referred to as a crosstalk avoidance scheme. In some instances, the frames and/or symbols in a DRA interval can be divided and allocated to each vector group, for example, based on certain metrics (e.g., amount of time it would take to transmit buffered data) of the vectoring groups according to a fairness criterion. Various fairness criteria such as Max-Min, Round-Robin, Maximum Throughput, or other fairness criteria can be used.

As an example, the max-min fair criterion can be used for resource allocation among multiple vectoring groups. For example, according to the max-min fair criterion, each vectoring group with data to send can be allocated a share of the available resources, and if one group does not use up its share, then the leftover allocation can be shared among the other groups. In some instances, if only one group has data to send, then that group can get all of the available resources.

In some implementations, the metric on which the max-min fair algorithm is based can include an offered load (e.g., a measure of traffic in a buffer/queue), a data rate (e.g., bits per second of offered load), bits (e.g., the number of bits waiting to be sent), time (e.g., time required to transmit bits waiting to be sent), or another attribute of the transmission load of a vectoring group. For instance, the time to transmit bits waiting to be sent can be chosen as the metric. For example, for a link within a vectoring group, the metric can be the time it would take to transmit all the data waiting to be sent in the link's buffer at the link's data rate. In some implementations, the time can be determined by dividing the amount of data by the link's date rate. For a vectoring group, the metric can be defined as the maximum time among all the links in the vectoring group. In this way, low rate links will not "hog" or otherwise dominate the available capacity.

Based on the metrics of the multiple vectoring groups, the DRA interval can be divided among the vectoring groups according to the max-min fair criterion or another allocation criterion. For example, the DRA interval can be divided (e.g., evenly) into transmission intervals (or sub-intervals) and allocated to the multiple vectoring groups; if any vectoring group does not need all the time allocated to it, then any un-needed time can be distributed (e.g., evenly) and allocated to one or more groups that need more time.

FIG. 2 is a block diagram showing an example crosstalk avoidance scheme 200. In this example, four vectoring groups 1, 2, 3, and 4 share a DRA interval of two frames 205 and 215. Each of the two frames 205 and 215 is further divided into four non-overlapping transmission intervals (or sub-intervals) that are allocated to the four vectoring groups 1, 2, 3, and 4, for example, based on the transmission loads (e.g., time to transmit buffered data) of the four vectoring groups. Specifically, the first frame 205 includes four transmission intervals 212, 222, 232, and 242 that are allocated to the groups 1, 2, 3, and 4, respectively; the second frame 215 includes four transmission intervals 214, 224, 234, and 244 that are allocated to the groups 1, 2, 3, and 4, respectively.

The allocated transmission intervals (e.g., the transmission intervals 212, 222, 232, 242, 214, 224, 234, and 244) can have the same or different duration but will have different starting points. For example, the first transmission interval 212 begins with the start of the frame 205 while the second transmission interval 222 begins after the first transmission interval 212 ends. In general, two or more transmission intervals can be disjoint. Although FIG. 2 shows that two neighboring transmission intervals (e.g., transmissions intervals 212 and 222) are adjacent, in some implementations, a guard interval (e.g., an interval during which payload data is not transmitted by either of group 1 or group 2) can be inserted in between neighboring transmission intervals.

For the first frame 205, since the groups 2 and 4 need less time to send buffered data, the groups 1 and 3 divide up the extra time left by groups 2 and 4. As such, the groups 1 and 3 are allocated with longer transmission intervals 212 and 232, respectively, while the groups 2 and 4 are allocated with shorter transmission intervals 222 and 242, respectively. Similarly, the second frame 215 is divided into four disjoint transmission intervals 214, 224, 234, and 244 that are allocated to the vectoring groups 1, 2, 3, and 4, respectively, based on their required time to transmit buffered data. Although FIG. 2 shows that the two frames 205 and 215, as well as the time allocations within each frame, are the same (periodic), in other implementations, the frames 205 and 215 can have different durations, and the time divisions/allocations within them can be different.

In some implementations, the crosstalk avoidance scheme can be implemented in different modes such as a distributed mode and a periodically awaken mode (also referred to as an L2.1 mode). In an L2.1 mode, each group can be periodically awoken at different times and non-overlapping times. L2.1 mode can be used, for example, for low power mode where the data rates are low (e.g. VoIP).

In a distributed mode, transmission intervals (e.g., in terms of symbols) allocated to groups can be distributed among $N_{dist} \leq N_{DRA}$ TDD frames. Here $N_{dist}$ sets the "period" of the distribution, such that every vectoring group with data to send can be granted at least one symbol over each $N_{dist}$-frame period within the DRA interval.

FIGS. 3 and 4 are block diagrams showing examples 300 and 400 of crosstalk avoidance in a distributed mode. In both examples, the DRA interval 305 includes three TDD frames 315, 325, and 335 ($N_{DRA}=3$), and each TDD frame includes eleven DMT symbols. Accordingly, the DRA interval includes a total of thirty-three DMT symbols. Suppose there are four vectoring groups 1 to 4 and the max-min fair algorithm determined the optimum time allocation is {8, 5, 3, 17} symbols for groups 1 through 4, respectively. FIG. 3 shows the case of the {8, 5, 3, 17} allocation with $N_{dist}=1$, whereas FIG. 4 shows the case with $N_{dist}=3$.

As illustrated in FIG. 3, for $N_{dist}=1$, each of the three TDD frames 315, 325, and 335 are divided among the four groups 1 to 4. Specifically, for the first TDD frame 315, the group 1 is allocated a transmission interval 312 including the first four symbols of the TDD frame 315; the group 2 is allocated a transmission interval 322 including the fifth symbol; the group 3 is allocated a transmission interval 332 including the sixth symbol; and the group 4 is allocated a transmission interval 342 including the last five symbols of the first TDD frame 315. For the second TDD frame 325, the group 1 is allocated a transmission interval 314 including the first two symbols; the group 2 is allocated a transmission interval 324 including the third through the fifth symbols; the group 3 is allocated a transmission interval 334 including the sixth symbol; and the group 4 is allocated a transmission interval 344 including the last five symbols of the second TDD frame 325. For the third TDD frame 335, the group 1 is allocated a transmission interval 316 including the first two symbols; the group 2 is allocated a transmission interval 326 including the third symbol; the group 3 is allocated a transmission interval 336 including the fourth symbol; and the group 4 is allocated a transmission interval 346 including the last seven symbols of the first TDD frame 335. Within each TDD frame, each group is allocated with at least one symbol while the total allocated symbols for groups 1-4 comply with the determined optimal allocation {8, 5, 3, 17} symbols.

On the other hand, in FIG. 4, $N_{dist}=3$ TDD frames (i.e., thirty-three symbols) are used collectively for resource allocation among the four groups. As illustrated, the group 1 is allocated a transmission interval 412 including the first eight symbols; the group 2 is allocated a transmission interval 422 including the ninth through thirteenth symbols; the group 3 is allocated a transmission interval 432 including the fourteenth through sixteenth symbols; and the group 4 is allocated a transmission interval 442 including the last seventeen symbols of the thirty-three symbols. In some implementations, the symbols can be allocated to the groups in another manner (e.g., in a different order).

Note that each TDD frame does not necessarily have the same number of symbols, and not every symbol must be occupied if there is not enough data to send. In some instances, $N_{dist}=1$ minimizes latency by distributing the symbols for a given group among all $N_{DRA}$ TDD frames.

In some instances, it is possible that two different vectoring groups (e.g., in a G.fast system) can actually have very little crosstalk coupling between them. In some implementations, the two vectoring groups that have little crosstalk between them can be considered as a single combined group (at least as far as the crosstalk avoidance scheme was concerned). As such, the two groups can be scheduled to transmit simultaneously.

In some implementations, because not all of the transmitters are operating simultaneously by using the crosstalk avoidance scheme (e.g., in a discontinuous mode), power consumption can be reduced. The power can be further reduced by setting the number of DMT symbols allocated less than the number of DMT symbols available.

The example crosstalk avoidance scheme discussed with reference to FIGS. 2-4 (e.g., with a max-min fair criterion, which is also referred to as Max-Min Fair Crosstalk Avoidance (MMFCA) scheme) allows multiple vectoring groups to transmit at disjoint time intervals to avoid inter-group crosstalk between vectoring groups. As such, the MMFCA scheme enforces that no two vectoring groups within a particular wire binder transmit simultaneously. In some implementations, MMFCA scheme can be combined with other transmission techniques or otherwise modified to optimize or otherwise improve the overall transmission capacity of a channel. For example, in some instances, it may be advantageous (e.g., in terms of system throughput) to allow two or more vectoring groups to transmit simultaneously (and therefore to interfere with each other) for at least some specified time period. As such, simultaneous transmission among two or more vectoring groups during a particular time period and alternate transmission by allowing only one vectoring group at a time (e.g., using MMFCA scheme) during another time period can be combined.

In some implementations, the total time available for transmission (e.g., the DRA interval) can be divided into the two intervals: a Normal Operation Interval (NOI) during which all vectoring groups transmit simultaneously; and a Discontinuous Operation Interval (DOI) during which no two vectoring groups (e.g., in the same wire binder) transmit simultaneously. During the NOI, because the crosstalk generated outside of a vectoring group may not be canceled, the transmission rate for any single line is reduced compared with the possible rate during DOI, but the total subscriber data throughput for all lines during NOI can be higher since all vectoring groups are transmitting simultaneously. Assume for purposes of example that the maximum data rate for any of the individual vectoring groups is X, and that the achievable data rate (e.g., summed data rate of all vectoring groups) when transmitting over all vectoring groups simultaneously is Y. In this example, despite reductions in data rates provided by each individual vectoring group, the total data rate Y provided by transmitting over all the vectoring groups can be higher than the maximum data rate X provided by any of the individual vectoring groups. Thus, the negative effects of the crosstalk between the vectoring groups (e.g., reduced individual data rates for the vectoring groups) does not outweigh the benefits of transmitting over all vectoring groups simultaneously (e.g., higher overall data rate).

During the DOI, the situation is reversed and the subscriber data throughput averaged for all DOI symbols can be higher than that achievable by NOI. Example techniques for determining when to use NOI mode and when to use DOI mode within a given DRA interval are described below.

In some implementations, each subscriber line served from the DSL system can determine its transmission bit mapping and its resulting achievable bit rate under both the NOI and DOI crosstalk conditions. Since uncancelled crosstalk from other vectoring groups can be present during NOI, the achievable bit rate for each vectoring group in NOI may generally be lower than the achievable bit rate for that vectoring group during DOI. In some implementations, the NOI and DOI bit rates and estimates of the loads to be sent on each line can be used as inputs for determining the durations of the NOI and DOI.

In some implementations, the durations of the NOI and DOI can be quantified in terms of frames (e.g., TDD frames), symbols (e.g., DMT symbols), seconds (or ns, µs, ms, etc.), or fractions thereof. For instance, the NOI and DOI can each include one or more symbols. In some implementations, for each link in a vectoring group, the number of symbols needed to transmit offered load (e.g., buffered data) for each mode can be determined by dividing the number of bits of the offered load by the number of bits per symbol that can be transmitted over the link in NOI and DOI modes, respectively.

In NOI mode, for a vectoring group, the peak number of symbols required by any link in the vectoring group determines the number of symbols required by that group. Since all groups transmit simultaneously in NOI mode, the total number of symbols required to transmit all loads of all groups in NOI mode equals the peak number of symbols required by any one vectoring group. On the other hand, since only one group transmits at a time in DOI mode, the total number of symbols required to transmit all loads of all groups in DOI mode equals the sum of the symbols required by each vectoring group. As the number of vectoring groups with loads to transmit increases, the additive effect of simultaneous transmission (and therefore the relative value of NOI vs. DOI) can increase. In some instances, the overall capacity of the system can be optimized or otherwise improved by using NOI when there are many vectoring groups with traffic to send, and then switching to DOI once enough vectoring groups have completed sending traffic so that DOI becomes more efficient.

FIG. 5 is a block diagram showing an example crosstalk avoidance scheme 500 that includes both NOI and DOI transmission modes. In this example, four vectoring groups 1-4 share two DRA intervals 515 and 525. The first DRA interval 515 is divided into a NOI 535 and a DOI 555, the second DRA interval 525 is divided into a NOI 545 and a DOI 565. During the first DRA interval 515, all four vectoring groups 1-4 transmit at the start of the DRA interval 515. Group 4 is the first group to complete sending its load 542 and sends idle flags 544 for the remainder of NOI 535. The four groups continue to transmit in NOI mode 535 until the group 2 completes sending its load 522 at 572, at which point the remaining two groups, groups 1 and 3 transition to DOI 555. During the NOI 535, all groups transmit at lower rates due to the crosstalk between the groups. During the DOI 555, the groups 1 and 3 can transmit at higher data rates because only one of the groups 1 and 3 transmit at a time. In this example, the group 3 occupies a latter portion of the DOI 555 to transmit its load 534 after the group 1 finishes its data transmission 514 over a former portion of the DOI 555.

During the second DRA interval 525, all four vectoring groups 1-4 start simultaneous transmission in NOI mode at the start of the DRA interval 525. Group 1 is the first group to complete sending its load 516 and sends idle flags 518 for the remainder of NOI 545. The four groups continue to transmit in NOI mode 545 until the group 4 completes sending its load 535 at 574, at which point the remaining two groups, the groups 2 and 3, transition to DOI 565. During the NOI 545, all groups transmit at lower rates while the groups 2 and 3 can transmit at higher data rates during the DOI 565. During the DOI 565, the group 3 occupies a latter portion of the DOI 565 to transmit its load 538 after the group 2 finishes its data transmission 526 over a former portion of the DOI 565.

In some instances, during the DOI 555 or 565, the transmission intervals allocated to the groups that still have data to send can be determined, for example, based on the MMFCA or another scheme. For instance, the transmission intervals can be allocated according to a distributed mode or an L2.1 mode. The order of data transmission (e.g., among groups and/or among links within a group) can be determined based on the priority of the data to be transmitted or another criterion.

In some implementations, example DRA algorithms described herein can be used to determine the durations of the NOI and DOI within a DRA interval. For example, assume that each DRA interval spans a fixed number of symbols. The first symbol in the DRA interval uses an index value 0. The following parameters can be defined:

RN[l]: the rate (e.g., in bits per symbol) achievable on line l in NOI mode,

RD[l]: the rate (e.g., in bits per symbol) achievable on line l in DOI mode, and L[l]: the estimated load in bits for line l.

In some implementations, the metric S[n] can denote the total number of symbols required to send all loads assuming the transition from NOI to DOI mode occurs at symbol n.

S[n] can be generated for each symbol n in the DRA interval from n=0 to n=$n_{max}$+1. For example, if there are 50 symbols in the interval, S[n] can have a total of 51 values, from S[0] to S[50]. In some implementations, S[n] can be generated according to the following steps:
  a. For each line l: generate Ln [n,l]=max(L[l]−nRN[l],0). This is the load remaining at symbol n assuming all previous symbols are sent in NOI mode.
  b. For each line l, generate s[n,l]=Ln [n,l]/RD[l]. This is the number of symbols (including fractional symbols) that it would take to transmit that line's remaining load if DOI started at symbol n.
  c. For each vectoring group g, determine the number of symbols required to send all remaining loads in the group, sg[n,g]=max(s[n,l],l∈g).
  d. The total number of symbols required to send all loads in all vectoring groups can be obtained by: S[n]=$\Sigma_g$sg[n,g]+n.

After S[n] for all possible values of n have been determined, the value n̄ for which S[n] is a minimum can be determined. The value ñ can be the number of symbols that should use NOI. As such, the transition point from the NOI to DOI, as well as the durations of the NOI and DOI, can be determined based on the value ñ. In some implementations, MMFCA scheme or other techniques can be used to allocate the remaining symbols between vectoring groups in DOI mode.

In some instances, many DRA intervals can be uncongested—that is, the total load can be sent in fewer than the number of symbols available. If maximizing performance is more important than minimizing power, the excess symbols can be allocated to NOI so they can be used to transmit additional traffic that arrives after the DRA calculations have been performed but before the interval is over. If optimizing power takes precedence, in some implementations, all transmitters can be turned off for some or all of the excess symbols.

The example DRA algorithm described above does not use max-min fair until the number of remaining symbols available for DOI has already been set. In some implementations, an incremental increase in performance may be obtained by using max-min fair at every symbol position n to test how much load can actually be sent in the remaining DOI interval before finalizing the size of the NOI interval.

FIGS. 6 and 7 are flow charts of example processes 600 and 700 for avoiding crosstalk among multiple vectoring groups (e.g., within a wire binder) in a DSL system, respectively. The processes 600 and/or 700 can be implemented, for example, as computer instructions stored on computer-readable media and executable by data processing apparatus, such as one or more processors of a network element within a telecommunications environment.

The example processes 600 and/or 700 may be implemented in a centralized location (e.g., a controller card of a network element) or be distributed among multiple locations (e.g., on multiple line cards of one or more network elements). The example processes 600 and/or 700 can be executed periodically (e.g., every 1 ms, every DRA interval, etc.), from time to time, or per request. The example processes 600 and/or 700, individual operations of the processes 600 and/or 700, or groups of operations may be iterated or performed simultaneously (e.g., using multiple threads). In some cases, the example processes 600 and/or 700 may include the same, additional, fewer, or different operations performed in the same or a different order.

With reference to the example process 600 in FIG. 6, for each vectoring group from multiple vectoring groups, a transmission load of the vectoring group is determined based on transmission loads of links within the vectoring group (610). In some instances, each vectoring group can include multiple transmission links (also referred to as lines/subscriber lines, twisted pair conductors, etc.), and the transmission load of the vectoring group can be determined based on the transmission loads of the multiple links within the vectoring group. For instance, a maximum transmission load from among the transmission loads of the links within the vectoring group can be selected as the transmission load of the vectoring group.

In some implementations, a transmission load of a link can be based on, for example, an offered load, a date rate (e.g., bits per second of offered load), an amount of data to be transmitted (e.g., the number of bits waiting to be sent), an amount of time to transmit an amount of data (e.g., in terms of frames, symbols, seconds, etc.), or another attribute associated with the link. In some instances, a transmission load of each link can be the time required to transmit an amount of data in a buffer of the link. In this case, the transmission load of the link can be determined based on a ratio of the amount of data to be transmitted over the link to a data rate of the link. In some implementations, determining transmission loads of the links include determining, for each link, a number of bits to be transmitted by the link over a specified period. Additional or different metrics can be defined as transmission loads of the links and hence the vectoring groups.

A different transmission interval is allocated to each vectoring group from the multiple vectoring groups based on the transmission loads of the multiple vectoring groups (620). In some implementations, each different transmission interval can be characterized by a duration (e.g., in terms of frames, symbols, seconds (or ns, μs, ms, etc.), or a fraction thereof) and an interval starting point (e.g., time within a DRA interval, symbol index, frame number, etc.). Two or more transmission intervals can have the same or different length/duration, but they would each have a different start time. The different transmission intervals can be disjoint, with or without guard intervals in between. Example transmission intervals 212, 222, 232, 242, 214, 224, 234, and 244 that are allocated to different vectoring groups are shown in FIG. 2.

In some implementations, the start time of the transmission intervals can determine the order of data transmissions among the multiple vectoring groups. In some instances, the start time of the transmission intervals (or the relative position of the transmission intervals within a DRA interval) can be determined, for example, according to, or independent of, the priorities of the data to be transmitted over the multiple vectoring groups. The data priority of a vectoring group can be defined, for example, to be the highest priority of data to be transmitted among the multiple links within the vectoring group. The priority of a vectoring group can be defined in another manner.

In some instances, if the transmission intervals are scheduled according to priority, a vectoring group with a higher data priority can be allocated with a transmission interval with an earlier start time. With such a priority handling approach, in some instances, a vectoring group with low rate but high priority traffic may starve out all other vectoring groups. Alternatively, if the transmission intervals are scheduled blind to priority, vectoring groups can share the time equally, regardless of data rate.

In some implementations, the transmission intervals can be allocated to each vectoring group among the multiple vectoring groups according to a max-min fair allocation, or another fairness criterion. In some implementations, the transmission intervals can be allocated to each vectoring group according to according to a distributed mode (e.g., according to the example techniques described with reference to FIGS. 3 and 4), an L2.1 mode, or another mode. In some implementations, each vectoring group can be allocated a single transmission interval (e.g., as in the examples shown in FIGS. 2 and 4); in other implementations, a vectoring group can be allocated more than one transmission interval (e.g., as in the example shown in FIG. 3 where the group 1 is allocated three transmission intervals 312, 314, and 316).

During each different transmission interval, at least a portion of the transmission load of the vectoring group that was allocated the different transmission interval is transmitted (630). In some implementations, the transmission intervals determined at 620 can be communicated to a scheduler associated with a transceiver of a network element. Then, at least a portion of the transmission load of the vectoring group (e.g., data packets) can be transmitted over the vectoring group during the allocated transmission interval.

In some implementations, data for a particular vectoring group are transmitted over more than one link of the vectoring group simultaneously, whereas no two vectoring groups are transmitted simultaneously.

In some implementations, data are transmitted over the links according to priorities of the data. For instance, once the transmission interval is allocated to a given vectoring group, the data associated with a link in the vectoring group can be scheduled, within the allocated transmission interval, according to priorities of the data.

In some implementations, data are transmitted over only a single vectoring group during two or more different transmission time intervals. For example, given a single vectoring group is allocated to more than one transmission time interval (e.g., each of the groups 1-4 in FIG. 3), the group can transmit data over the multiple allocated transmission time interval, for example, during different TDD frames.

Referring to FIG. 7, for each vectoring group from multiple vectoring groups, a transmission load of the vectoring group is determined based on transmission loads of links within the vectoring group (710). The transmission load of the vectoring group can be determined according to the example techniques described with reference to 610 in FIG. 6 or in another manner.

A resource allocation interval (RAI) that is shared by the multiple vectoring groups is identified (720). An RAI can be a DRA interval (e.g., the DRA interval 305, 405, 515, or 525 in FIGS. 3, 4, and 5, respectively). In some implementations, identifying an RAI includes identifying a first number of symbols that are transmitted during the RAI. For example, the RAI can include one or more frames (e.g., TDD frames in a G.fast system) that includes one or more of upstream and downstream frames.

Based on the transmission load of each vectoring group and by the network element, a first portion of the RAI that will be a NOI and a second portion of the RAI that will be a DOI are determined (730). In some implementations, determining a first portion of the RAI that will be a NOI and a second portion of the RAI that will be a DOI include determining a second number of the symbols that are allocated to the NOI and a third number of the symbols that are allocated to the DOI. As such, the duration of the NOI and DOI can be determined.

In some implementations, determining a first portion of the RAI that will be a NOI and a second portion of the RAI that will be a DOI include determining a start time of the NOI and a start time of the DOI. In some instances, the start time of the NOI is the same as the start time of the RAI, while the NOI can transition to the DOI at a particular symbol of the RAI, for example, to optimize the overall throughput of the multiple vectoring groups. In this document, unless specifically stated otherwise, the terms "first," "second," etc. are meant for purposes of designation and not for order or limitation. For example, in some instances, a DOI can precede a NOI. In some instances, there may be multiple NOIs and multiple DOIs, especially if a DRA interval spans multiple TDD frames. The first portion of the RAI that will be a NOI can correspond to one of the multiple NOIs, and the second portion of the RAI that will be a DOI can correspond to one of the multiple DOIs.

The NOI and DOI can be determined, for example, according to the example techniques described with reference to FIG. 5 and the example modified implementations of the DRA algorithms described above. For instance, the NOI and DOI can be determined based on the transmission loads (e.g., time, data rates, data amount) of the multiple vectoring groups determined at 710. In some implementations, a total number of symbols required to transmit all transmission loads of the multiple vectoring groups (e.g., the metric S[n]) can be determined, given that a transition between the NOI and the DOI occurs at a particular symbol (e.g., at symbol n) within the first number of symbols that are transmitted during the RAI. In some instances, the NOI and DOI can be determined by determining a transition between the NOI and the DOI at a particular symbol within the first number of symbols such that the total number of symbols required to transmit all transmission loads of the plurality of vectoring groups is a minimum.

In some implementations, to determine a transmission load of a vectoring group from the multiple vectoring groups, for a link within the vectoring group (e.g., a link or line l), a first data rate of the link during an NOI (e.g., $R_N[l]$) and a second data rate of the link during a DOI (e.g., $R_D[l]$) can be determined. A number of symbols required to transmit a transmission load of the link (e.g., the metric s[n,l]) can then be determined based on the first data rate and second data rate, given a transition between the NOI and the DOI at a particular symbol (e.g., at symbol n) within the first number of symbols that are transmitted during the RAI. A number of symbols required to transmit the transmission load of the vectoring group (e.g., the metric sg[n,g]) can then be determined based on the number of symbols required to transmit the transmission load of the link. For example, the number of symbols required to transmit the transmission load of the vectoring group can be determined to be the maximum number of symbols required to transmit the transmission load of a link, among all the links in the vectoring group.

Data are transmitted over all of the multiple vectoring groups during at least a portion of the NOI (740). Data are transmitted over fewer than all of the vectoring groups during the entire DOI (750). Example data transmissions during the NOI and DOI are shown in FIG. 6. In some implementations, the DOI can be further divided into different transmission intervals that can be allocated to the multiple vectoring groups, for example, according to the example process 600 in FIG. 6 or in another manner. Accordingly, in some instances, only one vectoring group transmits data at a time during the DOI.

The example crosstalk management technologies described in this document can be applied in various DSL systems. For instance, the processes 600 and/or 700 can be implemented in a frequency division vectoring (FDV) system in which VDSL2 and G.fast channels are bonded together to each subscriber. An example FDV system is described with reference to FIG. 8, which is provided for purposes of illustration only and not intended to limit the use of the crosstalk management technologies to this example environment. In some instances, the processes 600 and/or 700 can be implemented by one or more of the network elements or other devices in FIG. 8.

Figure 8:
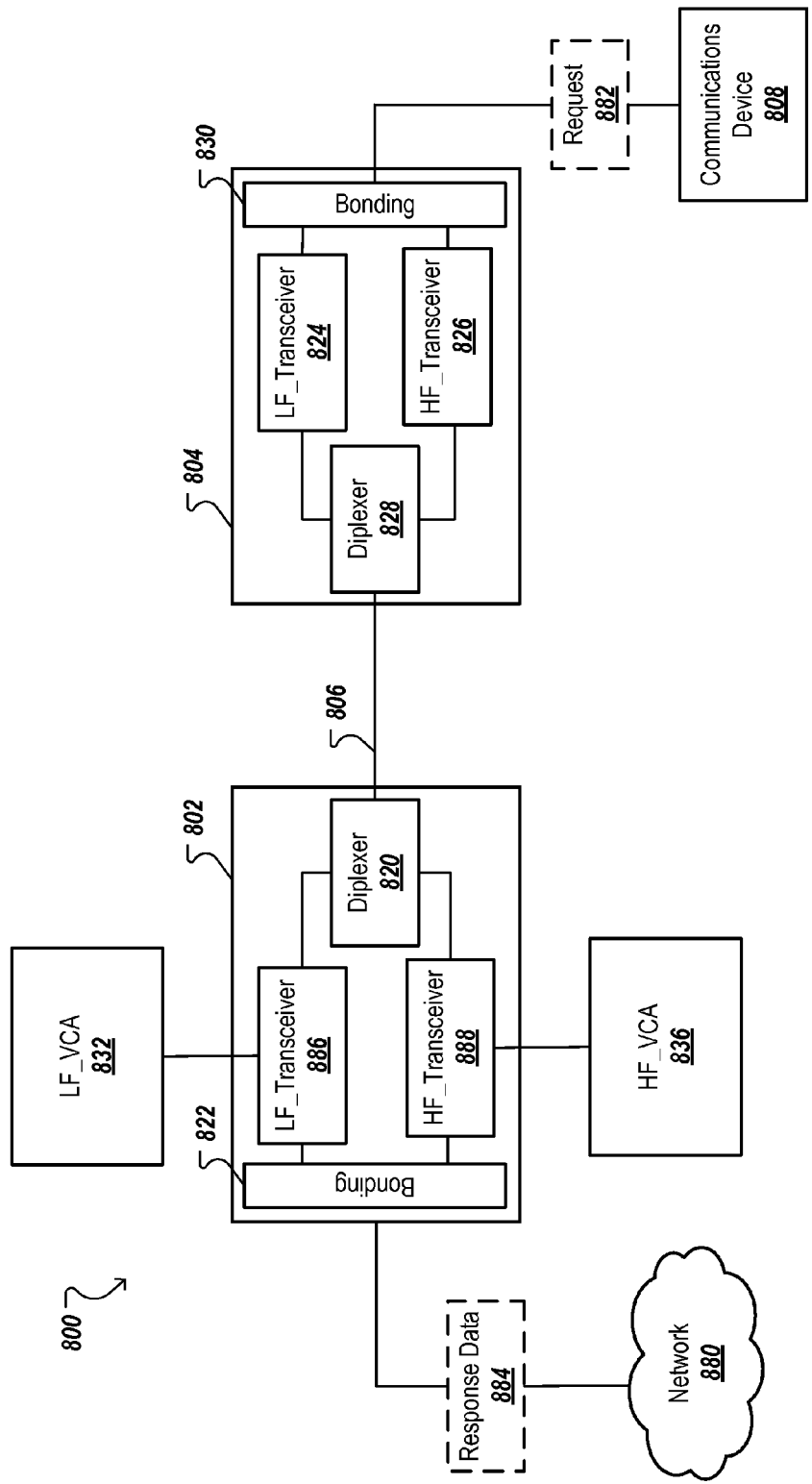
FIG. 8 is a block diagram of an example environment in which example crosstalk management techniques can be implemented.

FIG. 8 is a block diagram of an example environment 800 in which the crosstalk management technology discussed above can be utilized. The environment 800 includes a Digital Subscriber Line Access Multiplexer (DSLAM) transceiver 802 and a customer premises equipment (CPE) transceiver 804. The DSLAM transceiver 802 and the CPE transceiver 804 communicate with each other over a wire pair (or a twisted pair conductor) 806.

The DSLAM transceiver 802 and CPE transceiver facilitate communications between a communications device 808 (e.g., a computer, cable set top box, mobile device, tablet device, or another communications device) and a network 880 (e.g., the Internet). For example, the CPE transceiver 804 can receive a data request 882 (e.g., a request for a web page) from the communications device 808 and transmit data representing the request 882 to the DSLAM transceiver 802 over the wire pair 806. The DSLAM transceiver 802 then transmits data representing the request 882 over the network 880, receives response data 884 responsive to the request from the network 880, and transmits the response data 884 to the CPE transceiver 804. In turn, the CPE transceiver 804 communicates the response data 884 to the communications device 808.

The DSLAM transceiver 802 includes a LF_Transceiver 886, a HF_Transceiver 888, a diplexer 820, and a bonding engine 822. Generally, the LF_Transceiver 886 operates in one frequency range, while the HF_Transceiver 888 operates in a different frequency range. For example, the LF_Transceiver 886 can transmit and receive data over a frequency band that is at or below a specified maximum frequency (e.g., a frequency range up to 87.6 MHz), while the HF_Transceiver 888 can transmit and receive data over a frequency band that begins at or above the specified maximum frequency at which the LF_Transceiver 886 operates. In some implementations, the LF_Transceiver 886 is a VDSL2 transceiver (e.g., implemented according to ITU-T G.993.2 profile 17a), and the HF_Transceiver 888 is a G.fast transceiver (e.g., implemented according to ITU-T G.9700 and/or G.9701).

The diplexer 820 combines downstream communications from the LF_Transceiver 886 and HF_Transceiver 888 onto the wire pair 806 for delivery to the CPE transceiver 804 and separates upstream communications received from the CPE transceiver 804 to route the upstream communications to the appropriate transceiver (e.g., either the LF_Transceiver 886 or the HF_Transceiver 888). For example, the diplexer 820 can include an LF filter (e.g., a low pass and/or band pass filter) that filters signals that are outside the frequency band in which the LF_Transceiver 886 operates. The diplexer 820 can also include a HF filter (e.g., a high pass, a low pass, and/or band pass filter) that filters signals that are outside of the frequency band in which the HF_Transceiver 888 operates. In this example, connecting the LF_Transceiver 886 to the LF filter and connecting the HF_Transceiver 888 to the HF filter reduces the interference effects of each transceiver on the other. Thus, the LF_Transceiver 886 and HF_Transceiver 888 can both communicate over the same wire pair 806. In some implementations, the LF filter can be a bandpass filter having a pass band of 276 kHz-17.6 MHz, and the HF Filter can include one or both (e.g., connected in parallel) of a low pass filter having a cutoff frequency of 276 kHz and a high pass filter having a cutoff frequency of 17.6 MHz.

The bonding engine 822 facilitates transmission of data over multiple different twisted pair conductors. For example, the bonding engine can break Ethernet frames (or other frames of data) that are received from the network 880 into data fragments (e.g., portions of data from the frames) for transmission over the wire binder 886 (e.g., according to IEEE P802.3ah bonding, link aggregation based on IEEE 802.3ad, G.bond according to G.998.x, ATM (Asynchronous Transfer Mode) bonding, PTM (Packet Transfer Mode) bonding, or ECMP (equal cost multi-path routing)). The bonding engine 820 can determine which of the LF_Transceiver 886 and/or HF_Transceiver 888 will be used to transmit data fragments at any particular time. For example, the bonding engine can be implemented to split the data fragments to each of the LF_Transceiver 886 and HF_Transceiver 888. Other data fragment allocation techniques can also be used to allocate data fragments among the LF_Transceiver 886 and HF_Transceiver 888, as discussed above with reference to FIGS. 1-7. The bonding engine 822 also reconstructs Ethernet frames (or other frames of data) from data fragments that are received over the wire binder 886 (e.g., from the CPE transceiver 804) and transmits the reconstructed Ethernet frames over the network 880.

The CPE transceiver 804 includes elements similar to those discussed above with reference to the DSLAM transceiver 802. For example, the CPE transceiver 804 includes a LF_Transceiver 824, a HF_Transceiver 826, a diplexer 828, and a bonding engine 830. Each of these elements are configured in a similar manner as the similarly named elements discussed above with reference to the DSLAM transceiver 802, and perform similar operations. For example, the LF_Transceiver 824 can be a VDSL2 transceiver that transmits upstream VDSL2 traffic received from the bonding engine 830 (e.g., as data fragments) to the DSLAM transceiver 802, receives downstream VDSL2 traffic from the DSLAM transceiver 802, and outputs the downstream traffic to the bonding engine 830.

The HF_Transceiver 826 can be a G.fast transceiver that transmits upstream G.fast traffic received from the bonding engine 830 (e.g., as data fragments) to the DSLAM transceiver 802, receives downstream G.fast traffic from the DSLAM transceiver 802, and outputs the downstream traffic to the bonding engine 830.

The diplexer 828 can include filters similar to those discussed above with reference to the diplexer 820 so that transmissions from each of the LF_Transceiver 824 and the HF_Transceiver 826 can be carried over the same twisted pair conductors, and so that transmissions received from the DSLAM transceiver 802 can be separated and directed to the appropriate transceiver (e.g., the LF_Transceiver 824 or the HF_Transceiver 826).

The bonding engine 830 is configured in a similar manner as the bonding engine 822 and performs similar operations as those discussed above with reference to the bonding engine 822. For example, the bonding engine 830 can segment upstream data frames (e.g., Ethernet frames) into data fragments for transmission over multiple different twisted pair conductors and allocate the data fragments to the LF_Transceiver 824 and/or the HF_Transceiver 826 for transmission over the wire pair 806. The bonding engine 830 can also reconstruct data frames (e.g., Ethernet frames) from data fragments that are received by the LF_Transceiver 824 and/or HF_Transceiver 826. The bonding engine 830 (and/or bonding engine 822) can be connected to a switch (not shown) and/or other traffic management device (not shown) that can provide a communications interface between the bonding engine and the communications device 808 (or network 880).

The environment 800 includes a LF vectoring control apparatus 832 (LF_VCA) that is in communication with the LF_Transceiver 886 and all other LF_Transceivers in the vectoring group and a HF vectoring control apparatus 836 (HF_VCA) that is in communication with the HF_Transceiver 888 and all other HF_Transceivers in the vectoring group. Each of the VCAs facilitates vectoring to cancel crosstalk between transmissions over the various twisted pair conductors that are included in the wire pair 806 (e.g., according to ITU-T G.993.2, G.993.5 and/or G.9708). For example, the VCAs can learn coupling coefficients related to how signals on each wire couples to other wires in a same wire binder as the wire pair 806, and use the coefficients to create a precoding matrix. The precoding matrix is used to adjust (or precode) transmission characteristics so that crosstalk is cancelled when the transmissions reach the destination (e.g., CPE transceiver 804).

In some implementations, the LF_VCA 832 can be a VDSL2 vectoring apparatus that can generate precoding matrices for VDSL2 transmissions, and provide the LF_Transceiver 886 with vectoring data that cause the LF_Transceiver 886 to output precoded VDSL2 transmissions. Similarly, the HF_VCA 836 can be G.fast vectoring apparatus that can generate precoding matrices for G.fast transmissions, and provide the HF_Transceiver 888 with vectoring data that cause the HF_Transceiver 888 to output precoded G.fast transmissions.

In some implementations, transmitter precoding can be used only in the downstream direction, whereas receiver-based cancelation can be used in the upstream direction. The VCA can operate on multiple transceivers (e.g., all the transceivers in a vectoring group). In some implementations, a central control apparatus can be added in the example environment 800 that controls all VCAs to control multiple vectoring groups and manage the crosstalk, for example, based on the example techniques described in this document. In some implementations, such crosstalk management functions can be implemented in a distributive manner in one or more of the VCAs or other components of network elements in the example environment 800.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The operations described in this specification can be implemented as operations performed by a data processing device on data stored on one or more computer-readable storage devices or received from other sources.

The term "data processing device" encompasses all kinds of apparatus, devices, and machines for processing data, including by way of example a programmable processor, a computer, a system on a chip, or multiple ones, or combinations, of the foregoing, as well as telecommunications equipment that may include one or more data processing devices. The data processing device can include special purpose logic circuitry, e.g., an FPGA (field programmable gate array) or an ASIC (application specific integrated circuit). The data processing device can also include, in addition to hardware, code that creates an execution environment a computer program, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
   determining, by a network element and for each vectoring group from a plurality of vectoring groups, a transmission load of the vectoring group based on transmission loads of links within the vectoring group;
   identifying, by the network element, a resource allocation interval (RAI) that is shared by the plurality of vectoring groups;
   determining, based on the transmission load of each vectoring group and by the network element, a first portion of the RAI that will be a normal operation interval (NOI) and a second portion of the RAI that will be a discontinuous operation interval (DOI);
   transmitting, by the network element, data over all of the plurality of vectoring groups during at least a portion of the NOI; and
   transmitting, by the network element, data over fewer than all of the vectoring groups during the entire DOI, wherein data from at least two different vectoring groups are separately transmitted during at least two non-overlapping portions of the DOI, and wherein a transmission rate of data transmitted by a particular vectoring group during the DOI is higher than a transmission rate of data transmitted by the particular vectoring group during the NOI.

2. The method of claim 1, wherein determining a first portion of the RAI that will be a NOI and a second portion of the RAI that will be a DOI comprises determining a start time of the NOI and a start time of the DOI.

3. The method of claim 1, wherein:
determining a first portion of the RAI that will be a NOI and a second portion of the RAI that will be a DOI comprises determining a first number of symbols to be allocated to the NOI and a second number of symbols to be allocated to the DOI.

4. The method of claim 1, wherein determining, for each vectoring group from a plurality of vectoring groups, a transmission load of the vectoring group comprises determining a total number of symbols required to transmit all transmission loads of the plurality of vectoring groups given that a particular number of symbols is allocated to the NOI.

5. The method of claim 4, wherein determining a first portion of the RAI that will be a NOI and a second portion of the RAI that will be a DOI comprises determining a first number of symbols to be allocated to the NOI and a second number of symbols to be allocated to the DOI such that the total number of symbols required to transmit all transmission loads of the plurality of vectoring groups is a minimum.

6. The method of claim 1, wherein determining, for each vectoring group from a plurality of vectoring groups, a transmission load of the vectoring group comprises:
for a link within the vectoring group:
determining a first data rate of the link during an NOI;
determining a second data rate of the link during a DOI;
determining a number of symbols required to transmit a transmission load of the link based on the first data rate and second data rate, given that a particular number of symbols is allocated to the NOI; and
determining a number of symbols required to transmit the transmission load of the vectoring group based on the number of symbols required to transmit the transmission load of the link, given that a particular number of symbols is allocated to the NOI.

7. The method of claim 1, further comprising allocating different transmission intervals to the plurality of vectoring groups within the DOI.

8. A device, comprising:
a memory storing instructions executable by one or more data processing devices; and
one or more data processing devices that interact with the memory and execute instructions that cause the device to be configured to:
determine, for each vectoring group from a plurality of vectoring groups, a transmission load of the vectoring group based on transmission loads of links within the vectoring group;
identify a resource allocation interval (RAI) that is shared by the plurality of vectoring groups;
determine, based on the transmission load of each vectoring group, a first portion of the RAI that will be a normal operation interval (NOI) and a second portion of the RAI that will be a discontinuous operation interval (DOI);
transmit data over all of the plurality of vectoring groups during at least a portion of the NOI; and
transmit data over fewer than all of the vectoring groups during the entire DOI, wherein data from at least two different vectoring groups are separately transmitted during at least two non-overlapping portions of the DOI, and wherein a transmission rate of data transmitted by a particular vectoring group during the DOI is higher than a transmission rate of data transmitted by the particular vectoring group during the NOI.

9. The device of claim 8, wherein the device is configured to determine a start time of the NOI and a start time of the DOI.

10. The device of claim 8, wherein the device is configured to determine a first number of symbols to be allocated to the NOI and a second number of symbols to be allocated to the DOI.

11. The device of claim 8, wherein the device is configured to determine a total number of symbols required to transmit all transmission loads of the plurality of vectoring groups given that a particular number of symbols is allocated to the NOI.

12. The device of claim 11, wherein the device is configured to determine a first number of symbols to be allocated to the NOI and a second number of symbols to be allocated to the DOI such that the total number of symbols required to transmit all transmission loads of the plurality of vectoring groups is a minimum.

13. The device of claim 8, wherein the device is configured to:
for a link within the vectoring group:
determine a first data rate of the link during an NOI;
determine a second data rate of the link during a DOI;
determine a number of symbols required to transmit a transmission load of the link based on the first data rate and second data rate, given that a particular number of symbols is allocated to the NOI; and
determine a number of symbols required to transmit the transmission load of the vectoring group based on the number of symbols required to transmit the transmission load of the link, given that a particular number of symbols is allocated to the NOI.

14. The device of claim 8, wherein the device is configured to allocate different transmission intervals to the plurality of vectoring groups within the DOI.

15. A system, comprising:
a plurality of network elements; and
at least one of the plurality of the network element including one or more data processing devices configured to:
determine, for each vectoring group from a plurality of vectoring groups, a transmission load of the vectoring group based on transmission loads of links within the vectoring group;
identify a resource allocation interval (RAI) that is shared by the plurality of vectoring groups;
determine, based on the transmission load of each vectoring group, a first portion of the RAI that will be a normal operation interval (NOI) and a second portion of the RAI that will be a discontinuous operation interval (DOI);
transmit data over all of the plurality of vectoring groups during at least a portion of the NOI; and
transmit data over fewer than all of the vectoring groups during the entire DOI, wherein data from at least two different vectoring groups are separately transmitted during at least two non-overlapping portions of the DOI, and wherein a transmission rate of data transmitted by a particular vectoring group during the DOI is higher than a transmission rate of data transmitted by the particular vectoring group during the NOI.

16. The system of claim 15, wherein the one or more data processing devices are configured to determine a start time of the NOI and a start time of the DOI.

17. The system of claim 15, wherein the one or more data processing devices are configured to determine a first number of symbols to be allocated to the NOI and a second number of symbols to be allocated to the DOI.

18. The system of claim 15, wherein the one or more data processing devices are configured to determine a total number of symbols required to transmit all transmission loads of the plurality of vectoring groups given that a particular number of symbols is allocated to the NOI.

19. The system of claim 18, wherein the one or more data processing devices are configured to determine a first number of symbols to be allocated to the NOI and a second number of symbols to be allocated to the DOI such that the total number of symbols required to transmit all transmission loads of the plurality of vectoring groups is a minimum.

20. The system of claim 15, wherein the one or more data processing devices are configured to:
    for a link within the vectoring group:
        determine a first data rate of the link during an NOI;
        determine a second data rate of the link during a DOI;
        determine a number of symbols required to transmit a transmission load of the link based on the first data rate and second data rate, given that a particular number of symbols is allocated to the NOI; and
    determine a number of symbols required to transmit the transmission load of the vectoring group based on the number of symbols required to transmit the transmission load of the link, given that a particular number of symbols is allocated to the NOI.

21. The system of claim 15, wherein the one or more data processing devices are configured to allocate different transmission intervals to the plurality of vectoring groups within the DOI.

* * * * *

UNITED STATES PATENT AND TRADEMARK OFFICE
CERTIFICATE OF CORRECTION

PATENT NO. : 9,490,934 B2
APPLICATION NO. : 14/502573
DATED : November 8, 2016
INVENTOR(S) : Richard Lee Goodson and Kenneth David Ko Page 1 of 1

It is certified that error appears in the above-identified patent and that said Letters Patent is hereby corrected as shown below:

On the Title Page

Item [72], delete "Kenneth David Ho" and insert -- Kenneth David Ko --, therefor.

Signed and Sealed this
Thirteenth Day of November, 2018

Andrei Iancu
*Director of the United States Patent and Trademark Office*